United States Patent
Chapados et al.

(10) Patent No.: US 6,356,869 B1
(45) Date of Patent: Mar. 12, 2002

(54) METHOD AND APPARATUS FOR DISCOURSE MANAGEMENT

(75) Inventors: Nicolas Chapados, Montreal; Peter R. Stubley, Lachine; Claudia Pateras, Nun's Island; Réal R. Tremblay, Montreal, all of (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/302,254

(22) Filed: Apr. 30, 1999

(51) Int. Cl.$^7$ ............................................... G10L 21/00
(52) U.S. Cl. ........................................ 704/275; 704/270
(58) Field of Search .................................. 704/270, 275

(56) References Cited

U.S. PATENT DOCUMENTS

| | | | |
|---|---|---|---|
| 5,222,188 A | * 6/1993 | Hutchins | 704/200 |
| 5,477,451 A | * 12/1995 | Brown et al. | 704/1 |
| 5,510,981 A | * 4/1996 | Berger et al. | 364/419.02 |
| 5,610,812 A | * 3/1997 | Schabes et al. | 704/1 |
| 5,615,296 A | * 3/1997 | Stanford et al. | 704/201 |
| 5,768,603 A | * 6/1998 | Brown et al. | 704/240 |
| 5,805,832 A | * 9/1998 | Brown et al. | 704/240 |
| 5,848,389 A | * 12/1998 | Asano et al. | 704/239 |
| 5,913,062 A | * 6/1999 | Vrillo et al. | 704/201 |
| 6,044,347 A | * 3/2000 | Abella et al. | 704/272 |
| 6,154,722 A | * 11/2000 | Bellegarda | 704/257 |

OTHER PUBLICATIONS

Okada et al, "A Unification Grammar Directed One Pass Algorithm for Parsing Spoken Language", IEEE, 1991, 4.*
Kellner et al, "Initail Language Models for Spoken Dialogue Systems", IEEE 1998.*
Gerbino, E., Danieli, M., "Managing Dialogue in a Continuous Speech Understanding System.", Proc. EUROSPEECH 93.
Goddeau, D., Meng, H., Polifroni, J., Seneff, S., Busayapongchai S., "A Form–Based Dialogue Manager for Spoken Language Applications," Proc. ICSLP 96.
Pieraccini, R., Levin, E., Eckert, W., "AMICA, The AT & T Mixed Initiative Conversational Architecture," Proc. EUROSPEECH 97, Sep. 1997, Rhodes, Greece.

* cited by examiner

Primary Examiner—Fan Tsang
Assistant Examiner—Michael N. Opsasnick

(57) ABSTRACT

The invention relates to a system for providing a dialogue enabled speech application system, more particularly to a system apparatus and method for providing a mixed-initiative dialog with a user. The invention provides a discourse manager unit utilizing a dynamic finite-state machine that allows the creation of temporary transitions to accommodate a given context of the conversation without leading to an explosion in the number of finite-state machine states. The invention is particularly useful for use in natural-dialogue speech applications in particular for allowing users to perform actions by simply providing information to the system through spoken request.

28 Claims, 7 Drawing Sheets

METHOD AND APPARATUS FOR DISCOURSE MANAGEMENT

FIELD OF THE INVENTION

This invention relates to a method and an apparatus for automatically performing desired actions in response to spoken requests. It is particularly applicable to a natural-dialogue speech application system using a discourse management unit, as may be used to partially or fully automate reservation applications, telephone directory assistance functions, allocation applications, voice activated dialing (VAD), credit card number identification, appointment schedulers, automated rental car bookers and other speech recognition enabled services.

BACKGROUND OF THE INVENTION

Speech recognition enabled services are more and more popular today. The services may include stock quotes, directory assistance, reservations and many others. In most of these applications, when the information requested can be expressed as an alphanumeric or sequence of alphanumeric characters, the user is required to enter his request via a touch tone telephone. This is often aggravating for the user since he is usually obliged to make repetitive entries in order to perform a single function. This situation becomes even more difficult when the input information is a word or phrase. In these situations, the involvement of a human operator may be required to complete the desired task. To overcome these drawbacks the industry has devoted considerable efforts to the development of systems that reduce the labor costs associated with providing information services. These efforts comprise the development of sophisticated speech processing and recognition systems including natural language understanding and discourse management units.

In typical speech applications requiring a complex interaction with the user, the discourse manager (DM) unit keeps track of the context of the conversation. Keeping track of the context of the conversation generally entails remembering the relevant information said by the user to the system, and responding appropriately given that information. The process of keeping track of the context of a conversation is also known as discourse management.

A common method for discourse management is the use of an electronic form approach. Such a method is described in "A Form-based Dialogue Manager for Spoken Language Applications", Goddeau et al., Proc. ICSLP 1996, p.701–704 whose content is hereby incorporated by reference. In such systems, user interaction with the system is centered around filling the slots in the electronic form, while the system performs appropriate database query operations and summarizes the results it obtained.

In another commonly used discourse management process, the system keeps track of the context of the conversation by using an exhaustive dialogue state machine. The state machine explicitly models all the interactions that the user can have with the system where each possible reply to any system prompt leads to a new state in the finite state machine (FSM). The discourse manager interprets the input of the user on the basis of the state that it is currently in. Exhaustive dialog systems are well-known in the art to which this invention pertains. The reader is invited to refer to "Managing Dialog in a Continuous Speech Understanding System", E. Gerbino et al., Proc. Eurospeech 1993, p.1661–1664 whose content is hereby incorporated by reference.

Applications using discourse managers of the type described above generally consist of system-directed dialogues where the system initiates any conversation segment. Mixed-initiative systems that rely on this technology permit only extremely limited "initiative" on the part of the user. In addition discourse managers using a finite state machine of the type described above are generally not suitable for complex applications. In complex applications, such methods often lead to a very large increase in the number of states in the finite state machine as the application becomes more complex which renders the finite state machine unmanageable.

Thus, there exists a need in the industry to refine the process of discourse management so as to obtain an improved natural-dialogue speech application system.

SUMMARY OF THE INVENTION

The present invention is directed to a method and an apparatus for performing discourse management. In particular the invention provides a discourse management apparatus for assisting a user to achieve a certain task. The discourse management apparatus receives information data elements from the user, such as spoken utterances or typed text, and processes them by implementing a finite state machine. The finite state machine evolves according to the context of the information provided by the user in order to reach a certain state where a signal can be output having a practical utility in achieving the task desired by the user. The context based approach allows the discourse management apparatus to keep track of the conversation state without the undue complexity of prior art discourse management systems.

In one possible application of the present invention the discourse management apparatus is part of a natural-dialogue speech application system. In such a system there is generally more than one possible interpretation to any single user input. The discourse management (DM) unit of the dialog management apparatus performs the understanding of the input request in the context of a certain conversation. For each input utterance by a user, a set of operations are performed by the discourse management unit to derive from the logical form input received from a natural language understanding (NLU) unit the response to be outputted back to the user. The discourse management unit makes use of an expectation handling unit and a conversation analyzer to provide the context dependent interpretation capability. The expectation handling unit maps -the input data into data that is context dependent on the basis of dynamically generated remapping rules. The conversation analyzer receives the context-dependent data from the expectation handling unit and incorporates it into the state of the conversation. More precisely, the conversation analyzer keeps track of how the new context-dependent data should affect the system and the knowledge the system has of the user's goals.

One possible way to achieve the context-dependent interpretation of the input is to use two sets of rules namely context-dependent remapping rules, and context-dependent state-transition rules. Context-dependent remapping rules operate by matching specific patterns believed to be likely in the user logical form, and transforming them into a new form that makes explicit all the meaning implicitly present in the user's response. The exact transformation to be applied is determined by the prompts that were previously said by the system to the user. Context-dependent remapping rules are used by the expectation handling unit in the discourse management unit to map a user response into its meaning on the basis of the context of the conversation. Context-dependent state transition rules define new transitions in the finite state machine that are temporarily added to the finite state machine for the purpose of interpreting a specific user response. In one possible form of implementation, context dependent remapping rules and context-dependent state transition rules are allowed to be dynamically created, updated, and negated as the conversation progresses. They are not reused in subsequent turns rather they are replaced by new rules that are created as the conversation progresses. Advantageously, negating the context dependent rules allows making the finite state machine more manageable and provides increased flexibility in the dialog and in the natural-dialogue speech application system as a whole.

The invention also provides a novel method for performing discourse management.

For the purpose of this specification, the expression "in focus" is used to designate the active state of a finite state machine.

For the purpose of this specification, the expression "permanent transition" is used to designate a transition in a finite state machine that is independent of the context of a conversation.

For the purpose of this specification, the expression "temporary transition" is used to designate a transition in a finite state machine that is dependent of the context of a conversation. In a specific example, temporary transitions may be created dynamically in a finite state machine and may be destroyed when they are no longer required.

For the purpose of this specification, the expression "wildcard transition" is used to designate a transition in a finite state machine from a set of states to another state.

Other aspects and features of the present invention will become apparent to those ordinarily skilled in the art upon review of the following description of specific embodiments of the invention in conjunction with the accompanying figures.

DESCRIPTION OF A PREFERRED EMBODIMENT

Figure 1:
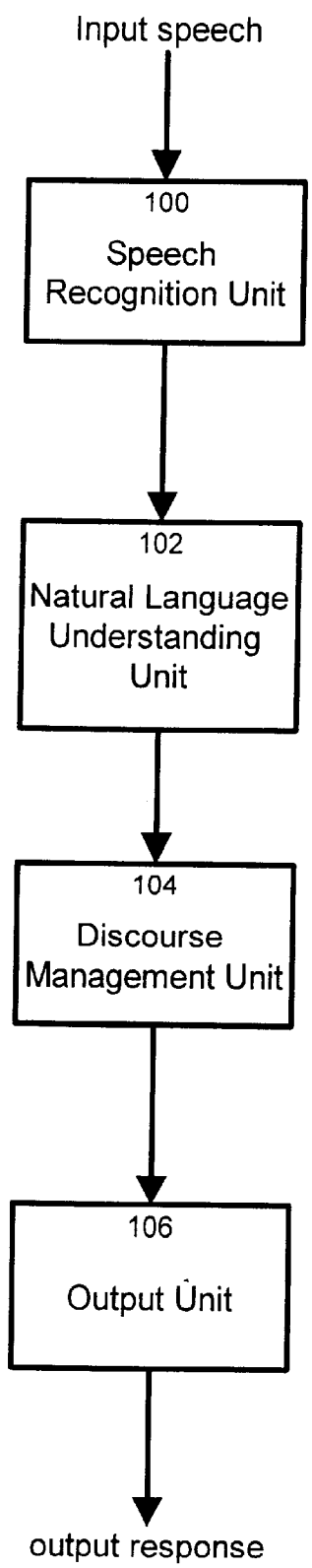
FIG. 1 shows a block diagram of a natural-dialogue speech application system implementing the inventive principles of the present invention.

In a preferred embodiment, the discourse management unit is integrated into a natural-dialogue speech application system providing mixed-initiative dialog with a user. In a specific example, the system is used to provide a service to the user in accordance with a certain task the user is desirous of achieving. As shown in FIG. 1, such a system preferably comprises a speech recognition unit 100, a natural language understanding unit (NLU) 102, a discourse management processor unit (DM) 104 and an output unit 106. The speech recognition unit 100 has an input for receiving a signal representative of a spoken utterance and an output to release a sequence of words. In a specific example, a speech recognition unit operative to perform continuous speech recognition is used to perform the speech recognition operation. Speech recognition units 100 suitable for use in such systems are well known in the art of speech recognition and their implementation will be readily apparent to those skilled in the art to which this invention pertains.

The natural language understanding unit 102 has an input for receiving a sequence of words and outputs information data elements representative of the meaning of the input sequence of words. These information data elements representative of the meaning of the input sequence of words will herein be referred to as logical form information data elements. Many varieties of natural language understanding units may be used in the context of the natural-dialogue speech application system described in FIG. 1. Such natural language understanding units are well known to those skilled in the art and there is no necessity to describe them in detail.

The discourse management processor unit 104 has an input for receiving logical form information data elements and an output for releasing data elements representative of a response to the user of the natural-dialogue speech application system. The discourse management processor unit 104 will be described in greater detail later on in the specification. The output unit 106 has an input for receiving data elements representative of a response and outputs a representation suitable to be understood by a human user. In a specific example, the output unit 106 is a text to speech synthesizer that generates auditory information on the basis of an input data string. In another specific example, the output unit is a display device such as a video display unit. Other embodiments of the output unit 106 may be used without detracting from the spirit of the invention.

In a typical interaction, the user of the natural-dialogue speech application system inputs a request in the form of a spoken utterance via a telephone or microphone set. In a specific example, the natural-dialogue speech application system is a room reservation system and the request is a request to make a reservation such as "I would like to make a reservation for next Tuesday". The speech recognition unit 100 receives a signal representative of the spoken utterance and transcribes the speech input into a sequence of words that forms part of the output. In the specific example, the sequence of words outputted is "I would like to make a reservation for next Tuesday". The sequence of words is received by the natural language understanding unit (NLU) 102. The NLU 102 converts the sequence of words into a representation, herein referred to as logical form information data elements, that summarizes the meaning of the input sequence. The logical form information data elements generated by the NLU 102 do not depend on the context of the conversation between the user and the system. In the specific example, the logical form information data elements outputted may be "make a reservation" and "next Tuesday". The logical form information data elements are then received by the discourse management processor unit 104. The discourse management processor unit 104 processes the logical form information data elements to understand the information in the context of the conversation. The discourse management processor unit 104 then performs the appropriate tasks related to the current state of the dialogue with the user and to the input request. In the specific example, the discourse management processor unit 104 establishes that a reservation is requested for next Tuesday. It may initiate a call to a database to establish what rooms are available for next Tuesday and output the data element representative of the following response "Conference room 234 is available next Tuesday from 2PM to 4PM. Would you like to confirm your reservation?". The output unit then receives the data element representative of the response and presents it to the user. In a specific example, this response is spoken in a natural-sounding voice using a text-to-speech synthesizer.

Figure 2:
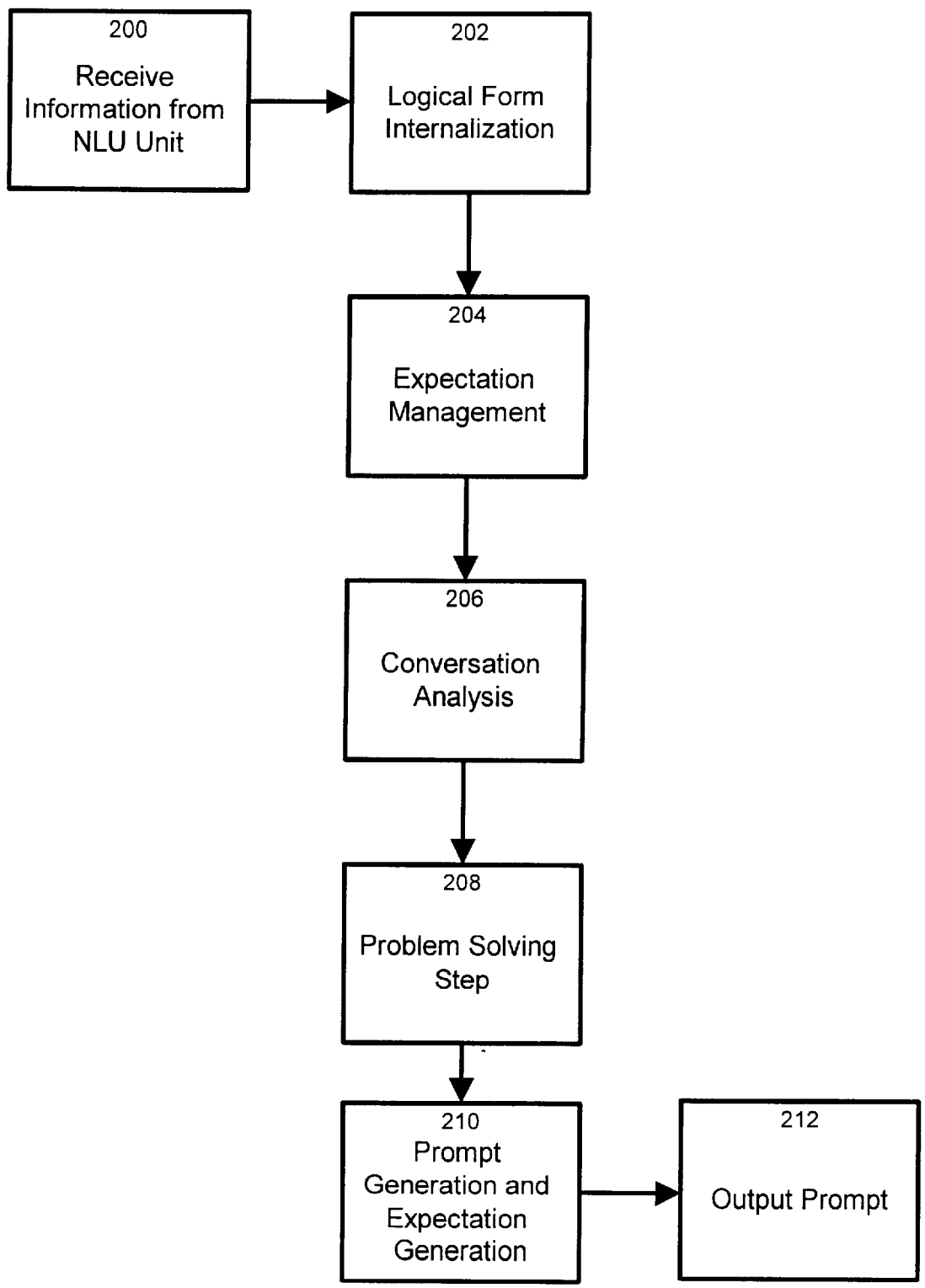
FIG. 2 shows a process flow diagram illustrating the operation of the discourse management unit forming part of the natural-dialogue speech application system shown in FIG. 1.

In this example, the discourse management processor unit 104 performs the understanding of the input request in the context of a certain conversation. For each input utterance a set of operations are performed by the discourse management processor unit 104 to derive from the logical form input received from the NLU 102 the response to be outputted back to the user. The functionality of the discourse management processor unit 104 is shown in greater detail in FIG. 2. In typical interaction, the discourse management processor unit 104 receives at 200 the logical form information data elements from the NLU unit. Following this the logical form information data elements are processed by a logical form internalization operation 202. The logical form internalization operation converts the logical form information data elements received from the NLU 102 into an internal representation, suitable for further processing within the discourse management processor unit 104. It is to be noted that where the internal representation and the representation of the output of the NLU are in the same representation, this step 202 may be omitted without detracting from the spirit of the invention. Following this, the internal representation is processed by the expectation management step 204. The expectation management step 204 performs at least a portion of the context-dependent interpretation of the logical form to output context-dependent data. A specific example will better illustrate this step. Suppose that a room reservation system according to the of this invention issues to the user a prompt requesting the desired "room capacity". The context of the conversation is therefore the system asking the user to provide information relating to room capacity. The expectation management step 204 maps the possible user response "ten", which is a single number, into the equivalent of context-dependent data "for ten people", a response that incorporates context. The context-dependent data is then processed by the conversation analysis operation 206. The conversation analysis operation 206 incorporates the contents of the context-dependent data into the state of the conversation. More precisely, the conversation analysis operation 206 keeps track of how this new context-dependent data should affect the system and the knowledge the system has of the user's goals. A second aspect of this operation is the determination of action data elements defining the next action the discourse management processor unit 104 should take as a result.

In a preferred embodiment, the conversation analysis operation 206 is carried out at least in part by a finite-state machine. A preferred embodiment of the finite-state machine used in accordance with the invention will be described in detail later on in the specification. Following this, the action data elements are processed by the problem solving operation 208. The problem solving operation 208 issues commands to perform the appropriate action. As a variant, this operation 208 performs the necessary actions, given the current dialogue context, for reaching the certain goal of the user. For example, the problem-solving step may query a database containing the rooms and their availabilities in order to get a list of available rooms that meet the user conditions. As yet another variant, the problem solving operation 208 is operative to relax the user conditions should the initial database query fail. For example, if the database content indicates that no rooms are available at the time specified by the user, an alternative solution may be provided such as an alternative date. The results obtained from the conversation analysis step 206 and the problem solving step 208 are then processed by the prompt generation and expectation generation step 210. The prompt generation and expectation generation step 210 synthesizes into a coherent response the results obtained during the execution of operations 206 and 208. Preferably, the response is constructed such that it guides the user through the dialogue, without overloading the user with information. This operation is also responsible for generating appropriate expectations that will be used by operation 204 and 206 on the following dialogue turn for interpreting the user's next input sentence. The prompt generated by operation 210 is then output from the discourse management processor unit 104.

Figure 3:
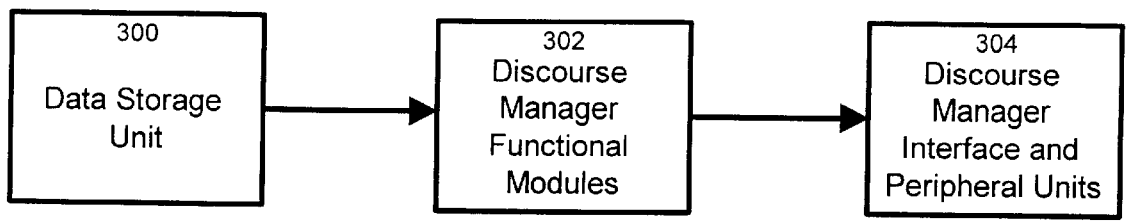
FIG. 3 shows a high-level functional block diagram of the discourse management unit shown in FIG. 1.

A high-level block diagram of an embodiment of the discourse management processor unit 104 is shown in FIG. 3. Such a unit generally comprises functional modules 302 implementing the functionality of the discourse management processor unit 104. The functional modules 302 interact with a data storage unit 300. The data storage unit 300 stores parameters and data elements for use by the functional modules 302. The data storage units may also include memory blocks suitable to receive data information from the functional modules 302 during the normal working of the discourse management processor unit 104. The discourse management processor unit 104 further includes interface and peripheral units 304 interacting with the functional modules 302. The interface and peripheral units 304 provide modules for accessing information sources that may be located outside the discourse management processor unit 104.

Figure 4:
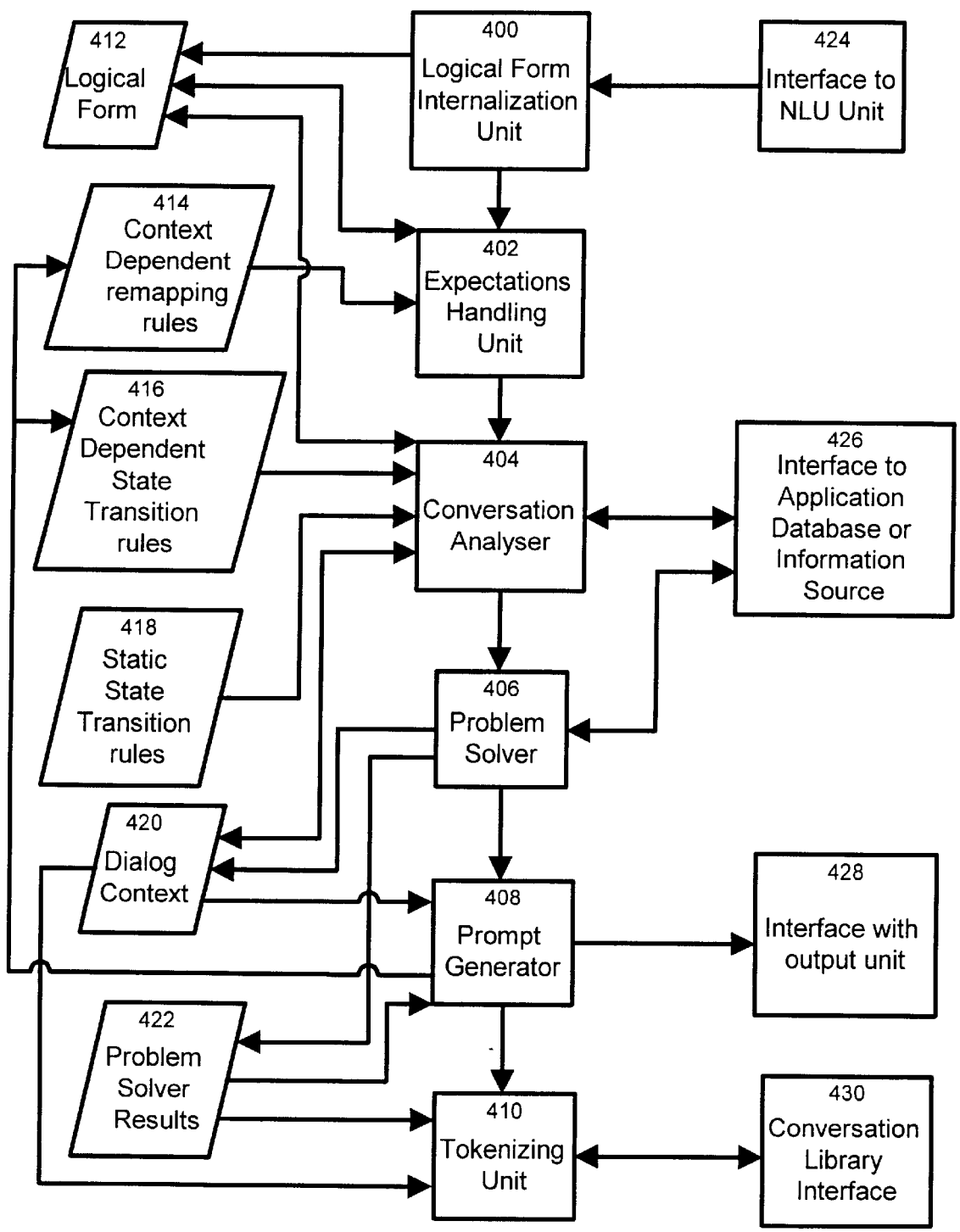
FIG. 4 shows a detailed functional block diagram of the discourse management unit shown in FIG. 1.

The structural relationship between the components of discourse management processor unit 104 depicted in FIG. 3 is shown in detail in FIG. 4. The functional modules 302 of such a unit 104 typically comprise a logical form internalization unit 400, an expectation handling unit 402, a conversation analyzer 404, a problem solver 406, a prompt generator 408 and a tokenizing unit 410. The data storage units 300 of the discourse management processor unit 104 typically comprise logical form data 412, remapping rules 414, context dependent state transition rules 416, permanent state transition rules 418, dialog context information 420 and problem solver results data 422. The interface and peripheral units 304 of the discourse management processor unit 104 typically comprise an interface 424 to the natural language understanding unit (NLU), an interface to a database 426 for use relative to an application, an output unit interface 428 and a conversation library interface.

The logical form data 412 provides the logical form internalization unit 400 with the data used to map the logical form information data elements, received from the NLU 102 through the NLU interface unit 424, into the internal representation suitable for use by the modules of the discourse management processor unit 104. Mapping data from one form to another is well-known in the art to which this invention pertains and the implementation of the logical form internalization unit 400 will be readily apparent to those skilled in the art.

In one embodiment, the invention provides context dependent interpretation capabilities implemented by the expectation handling unit 402 and the conversation analyzer unit 404. In a general mixed-initiative conversation application there is generally more than one possible interpretation to any single user input. Typically the selected interpretation depends on the current context of the conversation. A simple example will better illustrate this point. In a conference room reservation system, when the user says a single number as an input, the word "ten", the system can interpret it in several ways: as a number of people (room capacity), a day in the month (date), or a beginning or ending time. The particular interpretation selected depends on the question(s) the system asked previously. For the purpose of simplicity, the context-dependent interpretation of the user's input will be described as depending on the single previous prompt said by the system to the user. The context-dependent interpretation of the user's input may depend on more than one and in fact may depend on any number of previous prompts without detracting from the spirit of the invention as will be readily apparent to the person skilled in the art.

In one embodiment, the expectation handling unit 402 receives the data from the logical form interpretation unit 400 and remaps it into context dependent information data elements on the basis of dynamically generated remapping rules 414.

In one possible embodiment, context-dependent interpretation of the input is performed using two sets of rules namely context-dependent remapping rules 414, and context-dependent state-transition rules 416. The context-dependent remapping rules 414, and context-dependent state-transition rules 416 outlined above may be used during the interpretation of a single dialogue turn and are destroyed afterwards. They are not reused in subsequent turns rather they are replaced by new rules that are created as the conversation progresses.

Context-dependent remapping rules 414, herein designated as remapping rules, are generated by the prompt generator 408 for use by the expectation handling unit 402. In one embodiment the expectation handling unit 402 provides context-dependent interpretation of the internal representation information data elements. The remapping rules 414 are stored on a computer readable/writable medium accessible by the expectation handling unit 402 (reading) and by the prompt generator 408 (writing). More specifically, the remapping rules 414 are generated when a prompt is constructed within dialogue turn n, for use within dialogue turn n+1. The remapping rules 414 operate by matching specific patterns believed to be likely in the user logical form, and transforming them into a new form that makes explicit all the meaning implicitly present in the user's response. The exact transformation to be applied is determined by the prompt that was previously said by the system to the user. In a specific example, if the system prompts the user for a room capacity, the prompt generator 408 will also generate a remapping rule that interprets the possible user response "Ten" (a bare number) as "For ten people" (a room capacity). This newly generated remapping rule is then stored on a computer readable medium with the remapping rules 414. The next time the user provides an answer, the expectation handling unit 402 will consult the remapping rules 414 to determine how to interpret the input. Context-dependent (CD) state transition rules 416 are generated by the prompt generator 408 for use by the conversation analyzer 404.

In one embodiment the conversation analyzer 404 is modeled using a finite-state machine (FSM). The FSM is made up of a set of states, connected together by transitions. More specifically, each state of the FSM represents a goal to reach within the conversation with a user of the natural-dialogue speech application system. Goals may vary from one application to another without detracting from the spirit of the invention. Preferably each goal represents a high-level step of the application. Each of these goals is represented by a single state within the FSM each state being defined by a set of conversation state data elements. In a preferred embodiment, at any point during the conversation, a single state of the FSM is active, or said to be "in focus". It is with respect to the state "in focus" that the conversation analysis is made. More particularly the behavior of the discourse management processor unit 104 for the problem solver 406 and the prompt generator 408 is determined at least in part by the focused state in the FSM and the information contained in that state.

Figure 5:
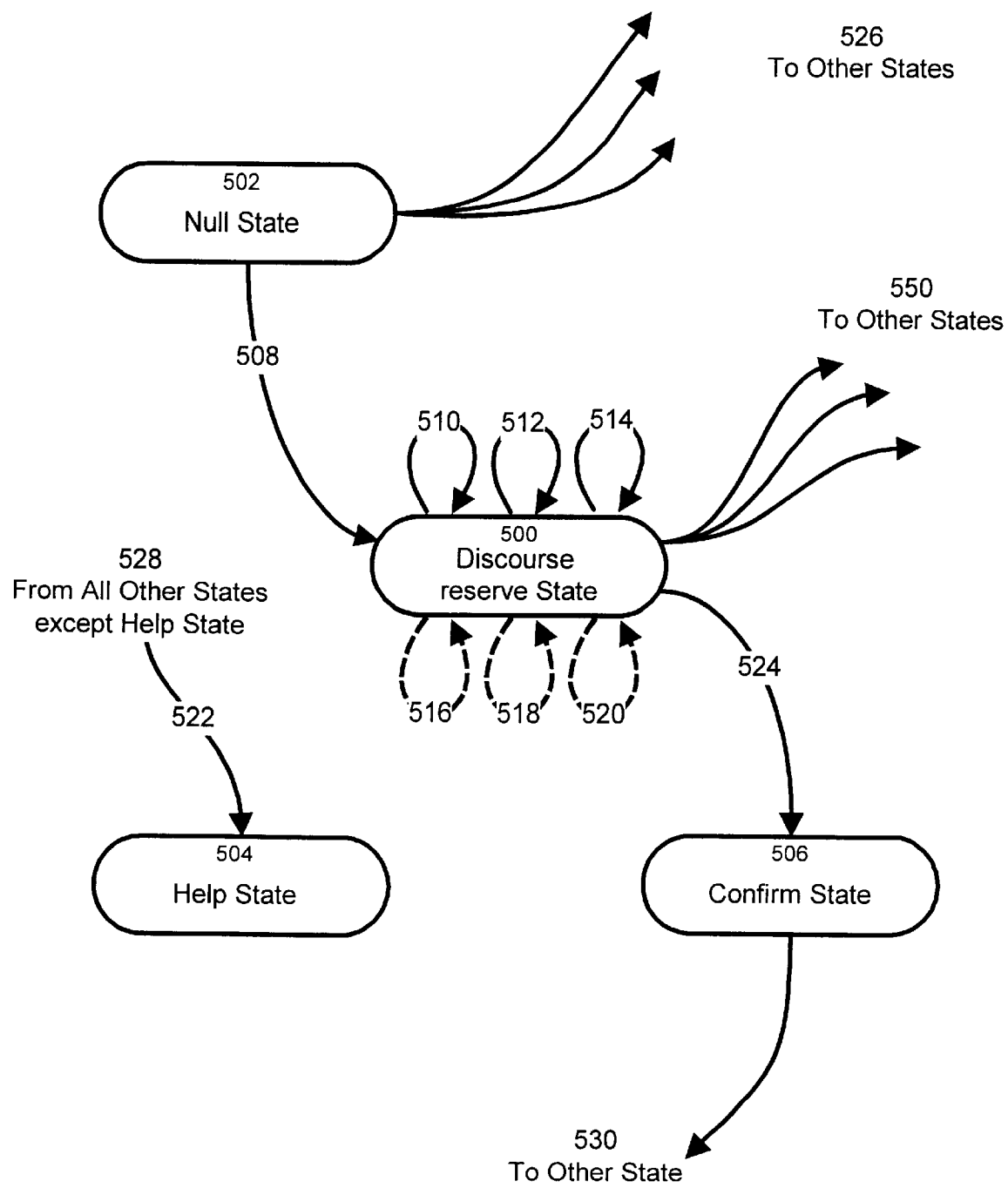
FIG. 5 shows a state diagram of the conversation analyser forming part of the discourse management unit depicted in FIG. 4.

FIG. 5 shows a diagram of a finite state machine that may be used in the context of a room reservation system. In the specific example of a room reservation system, goals may include (i) waiting for the user to initiate a request represented by the null state 502 (ii) obtaining from the user all the required information before making a room reservation represented by the discourse reserve state 500; (iii) pointing out incorrect information entered by the user, and ensuring that the user corrects it as represented by the help state 504; (iv) getting an ultimate confirmation from the user before finalizing a reservation represented by the confirm state 506. As shown, from the null state 502, the conversation analysis step may proceed to the discourse reserve state 500 through transition 508 or to other states 526.

Depending on the user's response to a given prompt, the focus can change from state to state following the direction set by transition rules 416, 418: the transition rules determine to which goal or sequence of goals the user should be taken in the conversation. -Optionally, transition rules may be assigned respective priority values directing the order in which the transitions are considered. These transition rules may be context dependent state transition rules 416 or permanent transition rules 418. Permanent transition rules 418 are defined by a set of transitions dependent on the state but independent on the context of the conversation. Conversely, context dependent state transition rules 416 depend on the context of the conversation and are dynamically generated. In one embodiment, the context dependent state transition rules 416 are generated by the prompt generator 408. The context dependent (CD) state transition rules 416 are stored on a computer readable/writable medium accessible by the conversation analyzer 404 (reading) and by the prompt generator 408 (writing). The CD state transition rules define new transitions in the finite state machine (FSM) that are temporarily added for the purpose of interpreting a specific user response. An advantage of these CD state transition rules is that the behavior followed when a transition is taken can depend on the context of the dialogue. Context-dependent state transition rules may be applied in many aspects of the conversation analyzer. In a specific example, context-dependent state transition rules are used to provide the discourse manager with "implicit confirmation" ability in a room reservation system. For instance, the discourse manager can recognize when a user wishes to pursue a certain room choice offered by the system without explicitly confirming. For example, if the system offers the room Germain next Tuesday from 1 to 5 pm, the user can respond with "Just from 2 to 4". A context-dependent state-transition rule is created by the prompt generator 408 which allows to recognize that the user's response fits properly within the context set forth by the previous system prompt but makes it more precise. The CD transition rule then completes the missing details, namely the room name Germain and the date next Tuesday and the time namely 2 to 4. The transitions are represented by arrows in FIG. 5. Whether a given transition is taken or not depends on whether the rule associated with the transition is activated. Transition rules are usually activated upon encountering specific pieces of information in the logical form information data elements extracted from the user's utterance. In addition to changing the focus, a second role of transition rules is that they transfer information specified by the user in the logical form information data elements to the private memory area of the current state. This allows the system to remember what the user said over the course of several dialogue turns. Note that many transitions are "self-loop transitions" that simply accumulate information into the private memory area of a state without changing the focus to a different state. For example the discourse reserve state 500 has six self-loop transitions 510 512 514 516 518 and 520, a transition 506 to the confirm state 506 and transitions to other states 524.

Figure 6:
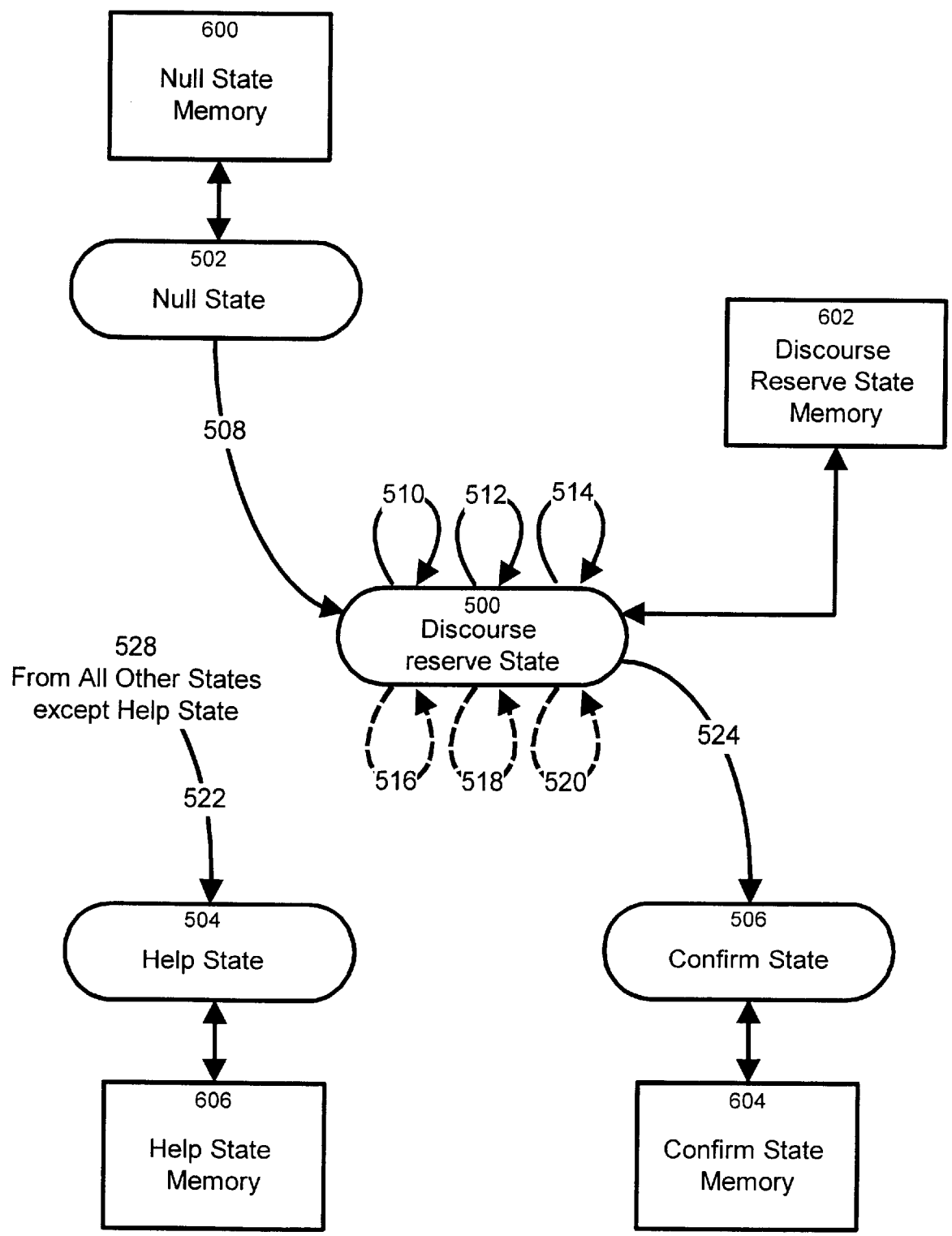
FIG. 6 shows the state diagram of FIG. 5 of the conversation analyser depicted in FIG. 5.

In one embodiment, each state in the FSM is allocated a private memory area herein referred to as the "state private slot". For each state, this area is used to accumulate several relevant discrete data elements of information from the user while the focus remains in the same state. FIG. 6 shows the finite state machine diagram of FIG. 5 with the transitions to states not in the diagram being removed. FIG. 6 also shows the memory allocated to each state of the finite state machine namely the null state memory 600 is assigned to the null state 502, the discourse reserve state memory 602 is assigned to the discourse reverse state 500, the help state memory 606 is assigned to the help state 606 and the confirm state memory is assigned to the conform state 506. For example, when the discourse state 500 is in focus, the data collected from the user is stored in the discourse reserve state memory 602.

As a variant, in addition to normal transitions that jump from a single state X to another single state Y, the FSM may be provided with wildcard transitions. In such an FSM, the states are grouped into a plurality of set. Wildcard transitions allow jumping from any state in a given set of states to a given destination state which may be pre-determined or dynamically generated. For example, as shown in FIG. 5, a single wildcard transition 522 has been created that allows the focus to shift from all states 528 to the help state 504. Advantageously, the use of wildcard transitions allows keeping the FSM complexity under control. An additional advantage of the wildcard transition is the reduction in maintenance cost it provides. For example, if a wildcard transition rule is to be modified, a single modification allows all the states using that rule to be updated.

A specific example will better illustrate the above description of the conversation analyzer 404. For the purpose of this example, assume FIG. 5 shows a small subset of the finite state machine for interpreting the last user utterance in the following dialogue fragment:

1. DM: "Welcome to the conference-Room Reservation System. How may I help you?
2. User: "I want a room for ten people tomorrow afternoon."
3. DM: "Germain is available tomorrow from 1 to 5. Would you like to reserve it?"

The FSM illustrated in FIG. 5 is used to interpret the user utterance that would come immediately after room suggestion given by the DM identified as sentence 3 above. The state discourse reserve 500 is in focus and the private memory area of discourse reserve 602 contains the information said so far by the user namely the information provided by sentence 2 above namely {room, ten people, tomorrow, afternoon}. The following transitions are shown:

a) Permanent Transition 508. This transition was taken when interpreting the first user request (sentence 2 above) The transition detected that the user's intention was to make a reservation, and it switched from the initial state Null 502 to the state discourse reserve 500 used for interpreting requests to reserve.

b) Permanent Transitions to other states 526. These transitions could also have been taken after the first user request. For example, they may have been used to service requests other than making a reservation.

c) Temporary Transition 516. This transition 516 is specific to the current context, it maps a "Yes" into accepting "Germain tomorrow from 1 to 5". For example, it may fill out the private memory area of discourse reserve 602 as follows: dc_room=germain, dc_data=tomorrow, dc_time=13–17. Once the user responds to question 3 above, the temporary transition 516 is removed or disabled.

d) Temporary Transition 518. This transition 516 is specific to the current context, it takes a user-specified time and supplies the remaining implicit information "Germain tomorrow". For example, if the user specifies "from 2 to 4" this transition maps it to "Germain tomorrow from 2 to 4" and may fill out as follows the private memory area of discourse reserve 602: dc_room=germain, dc_date=tomorrow, dc_time=14–16.

e) Temporary Transition 520. This transition 516 is specific to the current context, and may be defined by other rules specific to the current context. For example it may be used to fill out the missing context information given room, or given date.

f) Permanent Transitions 510 512 514. These transition are used to fill the private memory area of discourse reserve 602 with room, date, and time information specified by the user, when the temporary transitions 516 518 520 do not apply.

g) Permanent Transition 524. This transition first ensures that all the required information has been specified by the user. This transition may also require verifying in a database if such a free room exists. In the affirmative, transition 524 is taken to the confirm state 506 to ask the user for a confirmation before making the reservation effective.

h) Permanent Transitions to other states 550. These are transitions to other states to handle incorrect data entry, or changes of context.

Transitions 516, 518 and 520 and their associated rules are temporary. Preferably, they are created or enabled specifically for the purpose of understanding the current dialogue turn, and are destroyed afterwards. Advantageously, these temporary context dependent state transition rules permit the transition rules to be very specific to the current context of the dialogue.

Transitions in the finite state machine stop being taken when no more transition rules apply in the state in focus. In a specific example, no more transitions apply when all the information data elements provided said by the user as encoded by the current logical form data elements have been processed by the transitions rules and stored in the memory area of dialog context 420 assigned to the state in focus. At that point, the conversation analyzer 404 is done and the control is passed on to the problem solver 406.

The problem solver 406 receives data elements representative of action data elements from the conversation analyzer 404. The problem solver is also connected to the dialog context memory 420 which stores the data collected from the user. On the basis of the action data elements and the dialog context memory 420 content, the problem solver is operative to: i) access a database to retrieve some information through the interface to application database 426; and/or ii) generate a solution to the user request and store it in the problem solver result memory area 422 (such as for instance output a signal to the database to actually enter the reservation and thus complete the task requested by the user); and/or iii) determine what information is missing in reaching the user's task. Optionally, the problem solver 406 is operative to relax user constraints in the event that the database query is unsuccessful. In a specific example, a user requests to reserve a room from 10:00 AM to 12:00 PM. The database query returns a result to the problem solver 406 to the effect that there is no room available at that time. The problem solver 406 relaxes the time constraint of from "10:00 to 12:00" and instead queries for a reservation starting before noon and lasting 2 hours. The database query will return a successful result if the room was available for instance from 10:15 to 12:15. Relaxing the rules may be done by providing a mapping operation between a first set of constraints and a second set of constraints.

The prompt generator 408 receives the results from the problem solver 406 and formulates a response or prompt to advance in the completion of the user's goal. For example, if the problem solver determines that the time for the reservation is missing, the prompt generator will generate a prompt that will request from the user the time such as "At what time would you like to reserve the room?". The prompt is outputted via the output unit interface 428. The prompt generator 408 also generates context dependent remapping rules 414 and the context dependent transitions 416 is association with the prompt. In the same example, the prompt generator 408 will generate a rule that maps a number such as "3" as meaning "at 3 o'clock" or something equivalent.

The tokenizing unit 410 is used for recording the operations performed by the discourse management processor unit 104 as a whole. The operations performed are recorded in a log file and may be used for debugging purposes, for statistical and performance analysis or for other book keeping activities. The tokenizing unit 410 may be omitted from the discourse management processor unit without detracting from the spirit of the invention.

Figure 7:
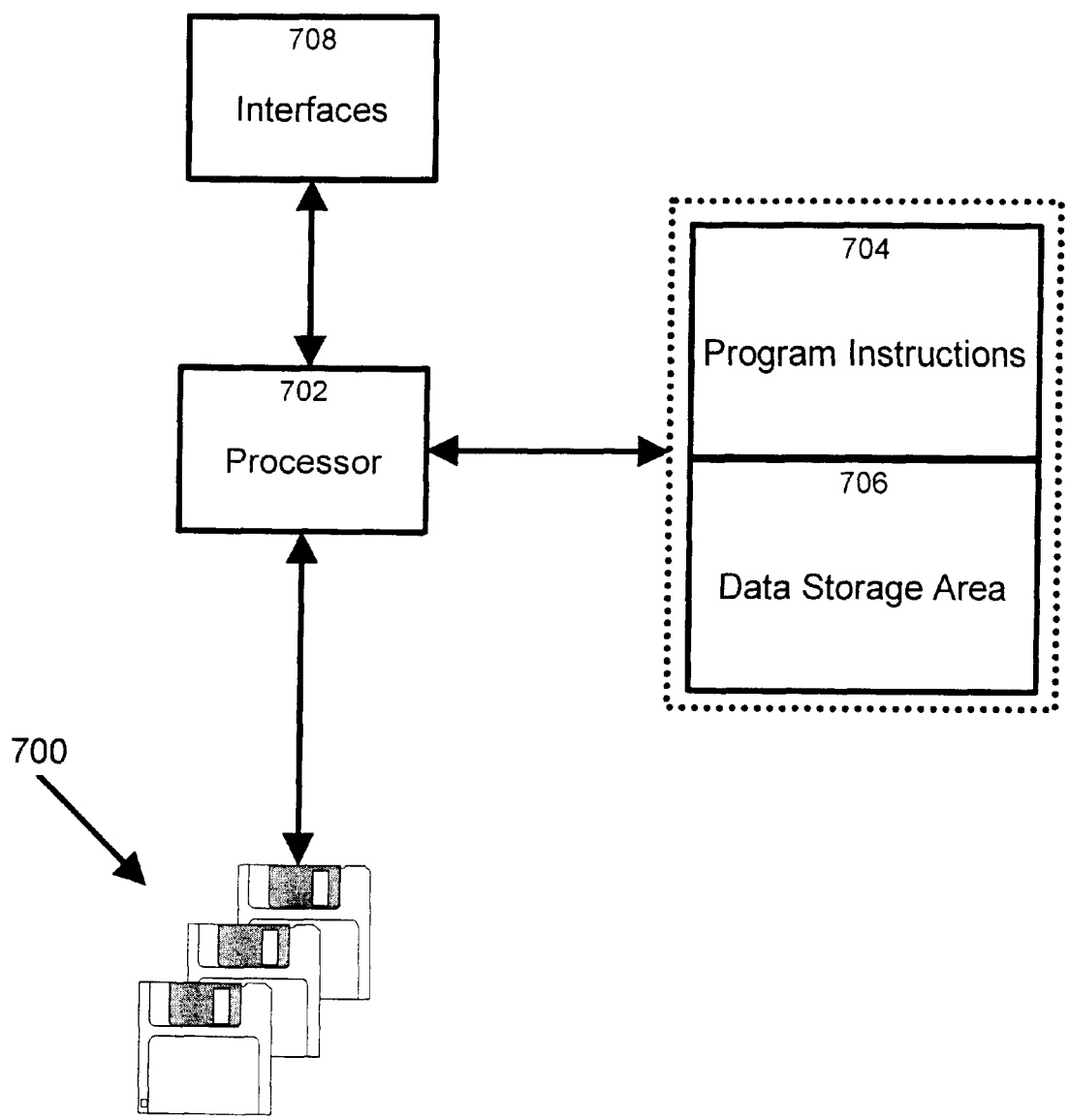
FIG. 7 shows an apparatus for implementing the discourse management unit in accordance with the invention.

The above-described method for performing discourse management can also be implemented on any suitable computing platform as shown in FIG. 7. Such computing platform typically includes a CPU 702 and a memory or computer readable medium 700 connected to the CPU 702 by a data communication bus. The memory stores the data 706 and the instructions of the program 704 implementing the functional blocks depicted in the drawings and described in the specification. That program 704 operates on the data 706 in accordance with the algorithms described above to provide discourse management operations using the techniques described in this specification. The CPU 702 and memory 700 may also interact with interfaces 708 to receive and/or output data in connection with the processes described in the specification.

Although the present invention has been described in considerable detail with reference to certain preferred embodiments thereof, variations and refinements are possible without departing from the spirit of the invention as have been described throughout the document. Therefore, the scope of the invention should be limited only by the appended claims and their equivalents.

What is claimed is:

1. A discourse management apparatus, said apparatus comprising:
   an input for receiving successively signals representative of information data elements relating to a certain task a user is desirous of achieving;
   a processing unit coupled to said input for processing said signals, said processing unit being operative to implement a finite state machine capable to acquire a plurality of functional states linked by transitions, said transitions forming a set;
   said processing unit being responsive to an information data element in a first signal applied to said input for enabling a sub-set of said set of transitions;
   said processing unit processing an information data element in a second signal applied to said input subsequently to said first signal to cause said finite state machine to evolve by following at least one of said transitions in said sub-set of transitions;
   said processing unit having an output, said processing unit being operative to generate a signal having a practical utility in achieving the certain task when the finite state machine evolves to a given state.

2. An apparatus as defined in claim 1, wherein the evolution of said finite state machine in response to said signals applied to said input define a context associated to the certain task.

3. An apparatus as defined in claim 2, wherein said processing unit includes an expectation handling unit for processing the signals applied to the input on the basis of said context to derive context dependent data items.

4. An apparatus as defined in claim 3, wherein said expectation handling unit makes use of a plurality of context dependent remapping rules to generate context dependent data items.

5. An apparatus as defined in claim 3, wherein said processing unit is operative to cause said finite state machine to evolve at least in part on the context dependent data items.

6. An apparatus as defined in claim 4, wherein said processing unit further comprises a prompt generator for generating a prompt signal, said processing unit further including an output for releasing the prompt signal for communication to the user.

7. An apparatus as defined in claim 6, wherein said prompt generator is operative to generate said context dependent remapping rules on the basis of said prompt signal.

8. An apparatus as defined in claim 1, wherein said transition set includes transitions that are permanently enabled.

9. An apparatus as defined in claim 2, wherein said processing unit is operative to cause said finite state machine to evolve at least in part on the basis of context-dependent transition rules.

10. An apparatus as defined in claim 9, wherein said processing unit further comprises a prompt generator for generating a prompt signal, said processing unit further including an output for releasing the prompt signal for communication to the user.

11. An apparatus as defined in claim 10, wherein said prompt generator is operative to generate said context dependent transition rules on the basis of said prompt signal.

12. An apparatus as defined in claim 1, comprising:
a processor;
a computer readable storage medium coupled to said processor, said computer readable storage medium comprising a program element for execution by said processor for implementing said processing unit, said computer readable storage medium comprising a plurality of data storage locations associated to respective functional states for storing data relative to the associated functional state.

13. An apparatus as defined in claim 1, wherein at least some of said functional states are grouped into subsets, functional states in one of said subsets being linked to other functional states by a common wildcard transition.

14. A method for performing discourse management, said method comprising:
receiving successively signals representative of information data elements relating to a certain task a user is desirous of achieving;
implementing a finite state machine capable to acquire a plurality of functional states linked by transitions, said transitions forming a set;
processing an information data element in a first signal applied to said input to enable a sub-set of said set of transitions;
processing an information data element in a second signal applied to said input subsequently to said first signal to cause said finite state machine to evolve by following at least one of said transitions in said sub-set of transitions;
generating an output signal having a practical utility in achieving the certain task when the finite state machine evolves to a given state.

15. A method as defined in claim 14, wherein the evolution of said finite state machine in response to said signals defines a context associated to the certain task.

16. A method as defined in claim 15, further comprising the step of processing the signals on the basis of said context to derive context dependent data items.

17. A method as defined in claim 16, wherein said context dependent data items are derived at least in part on the basis of a plurality of context dependent remapping rules.

18. A method as defined in claim 16, wherein said finite state machine evolves at least in part on the basis of said context dependent data items.

19. A method as defined in claim 17, further comprising the step of generating a prompt signal and releasing the prompt signal for communication to the user.

20. A method as defined in claim 19, further comprising the step of generating said context dependent remapping rules on the basis of said prompt signal.

21. A method as defined in claim 14, wherein said transition set includes transitions that are permanently enabled.

22. A method as defined in claim 15, further comprising the step of causing said finite state machine to evolve at least in part on the basis of context-dependent transition rules.

23. A method as defined in claim 22, further comprising the step of generating a prompt signal and releasing the prompt signal for communication to the user.

24. A method as defined in claim 23, further comprising the step of generating context dependent transition rules on the basis of said prompt signal.

25. A method as defined in claim 14, wherein at least some of said functional states are grouped into subsets, functional states in one of said subsets being linked to other functional states by a common wildcard transition.

26. A computerized reservation system comprising the apparatus defined in claim 1.

27. A natural-dialogue speech application system comprising:
an input for receiving a first signal representative of a spoken utterance;
a speech recognition unit for processing the first signal to derive a sequence of word potentially corresponding to the spoken utterance;
a natural language understanding unit being operative to process said sequence of words to derive summary data elements;
a discourse management unit as defined in claim 1.

28. A discourse management apparatus, said apparatus comprising:
means for receiving successively signals representative of information data elements relating to a certain task a user is desirous of achieving;
processing means coupled to said input for processing said signals, said processing means being operative to implement a finite state machine capable to acquire a plurality of functional states linked by transitions, said transitions forming a set;
said processing means being responsive to an information data element in a first signal for enabling a sub-set of said set of transitions;
said processing means processing an information data element in a second signal received subsequently to said first signal to cause said finite state machine to evolve by following at least one of said transitions in said sub-set of transitions;
said processing means being operative to generate a signal having a practical utility in achieving the certain task when the finite state machine evolves to a given state.

* * * * *